(12) United States Patent
Lehmann et al.

(10) Patent No.: US 10,132,436 B2
(45) Date of Patent: Nov. 20, 2018

(54) QUICK CONNECT/DISCONNECT ADAPTOR SYSTEM

(71) Applicant: Fiskars Oyj Abp, Helsinki (FI)

(72) Inventors: Charles A. Lehmann, Metamora, IL (US); Robert R. Brimble, Edwards, IL (US); Lawrence P. Heren, East Peoria, IL (US)

(73) Assignee: FISKARS OYJ ABP, Helsinki (FI)

( * ) Notice: Subject to any disclaimer, the term of this patent is extended or adjusted under 35 U.S.C. 154(b) by 411 days.

(21) Appl. No.: 14/210,758

(22) Filed: Mar. 14, 2014

(65) Prior Publication Data

US 2014/0300099 A1 Oct. 9, 2014

Related U.S. Application Data

(60) Provisional application No. 61/790,045, filed on Mar. 15, 2013.

(51) Int. Cl.
*F16L 37/113* (2006.01)
*F16L 55/11* (2006.01)

(52) U.S. Cl.
CPC ......... *F16L 37/113* (2013.01); *F16L 55/1141* (2013.01); *Y10T 29/49428* (2015.01)

(58) Field of Classification Search
CPC ............... F16L 37/113; F16L 55/1141; Y10T 29/49428

(Continued)

(56) References Cited

U.S. PATENT DOCUMENTS

| 643,358 A | 2/1900 | Konold |
| 796,306 A | 8/1905 | Exley |

(Continued)

FOREIGN PATENT DOCUMENTS

| DE | 5 08 311 | 9/1930 |
| DE | 5 87 085 | 10/1933 |

(Continued)

OTHER PUBLICATIONS

Non-Final Office Action on U.S. Appl.No. 13/924,455 dated Mar. 26, 2015, 11 pages.

(Continued)

*Primary Examiner* — Phi D A
*Assistant Examiner* — Omar F Hijaz
(74) *Attorney, Agent, or Firm* — Foley & Lardner LLP

(57) ABSTRACT

A quick connect/disconnect (QCD) system includes a first component and a second component. The first component includes a first body defining a first fluid channel extending between a first end portion and a second end portion and defining a longitudinal axis, a first QCD coupling portion located at the first end portion, a first adaptor coupling portion located at the second end portion, and a first mating portion of a mating assembly operably connected to the first body. The second component includes a second body defining a second fluid channel extending between a third end portion and a fourth end portion, a first threaded coupling portion located at the third end portion, a second adaptor coupling portion between the third end portion and the fourth end portion, and a second mating portion of the mating assembly operably connected to the second body.

20 Claims, 17 Drawing Sheets

(58) Field of Classification Search
USPC .......................................................... 285/91
See application file for complete search history.

(56) References Cited

U.S. PATENT DOCUMENTS

| | | | |
|---|---|---|---|
| 939,211 A | 11/1909 | Brown | |
| 1,181,060 A | 4/1916 | Bennett | |
| 1,813,581 A | 7/1931 | Rodrigues | |
| 1,845,882 A | 2/1932 | Litschge | |
| 1,885,321 A | 11/1932 | Benn | |
| 1,968,075 A | 7/1934 | Ewald | |
| 2,129,704 A | 9/1938 | Meyer | |
| 2,248,701 A | 7/1941 | Fowler | |
| 2,265,267 A | 12/1941 | Cowels | |
| 2,305,841 A | 12/1942 | Carlson | |
| 2,319,015 A * | 5/1943 | Speth | F16L 29/04 |
| | | | 137/614.03 |
| 2,393,489 A | 1/1946 | Trautman | |
| 2,457,251 A | 12/1948 | Main, Jr. | |
| 2,459,477 A | 1/1949 | Van Schuyver | |
| 2,598,009 A | 5/1952 | Peeps | |
| 2,661,225 A * | 12/1953 | Lyon | F16L 33/207 |
| | | | 285/222.4 |
| 2,843,401 A | 7/1958 | Rogers | |
| 2,968,497 A | 1/1961 | Treleman | |
| 3,028,179 A | 4/1962 | Abramoska | |
| 3,100,655 A * | 8/1963 | Work | F16L 37/107 |
| | | | 285/316 |
| 3,477,688 A | 11/1969 | Cruse | |
| 3,625,251 A | 12/1971 | Nelson | |
| 3,649,052 A | 3/1972 | Snyder, Jr. | |
| 3,650,507 A | 3/1972 | Nyberg | |
| 3,719,918 A | 3/1973 | Kerr | |
| 3,961,645 A | 6/1976 | Kagan | |
| 4,290,440 A | 9/1981 | Sturgis | |
| 4,327,770 A * | 5/1982 | Brown | F16L 37/252 |
| | | | 137/614.03 |
| 4,332,273 A | 6/1982 | Boyce | |
| 4,366,945 A | 1/1983 | Blauenstein | |
| 4,632,433 A | 12/1986 | Kimura | |
| 4,893,846 A * | 1/1990 | McGraw | F16B 7/0426 |
| | | | 285/133.4 |
| 4,932,431 A * | 6/1990 | Silagy | F16L 37/23 |
| | | | 137/174 |
| 5,009,252 A | 4/1991 | Faughn | |
| 5,087,086 A | 2/1992 | Snedeker | |
| 5,143,346 A | 9/1992 | Chen | |
| 5,190,224 A | 3/1993 | Hamilton | |
| 5,255,714 A * | 10/1993 | Mullins | F16L 37/23 |
| | | | 137/614.04 |
| 5,280,876 A | 1/1994 | Atkins | |
| 5,285,510 A | 2/1994 | Slaney | |
| 5,485,982 A | 1/1996 | Gunderson | |
| 5,560,548 A | 10/1996 | Mueller et al. | |
| 5,738,143 A * | 4/1998 | Faughn | F16L 37/373 |
| | | | 137/614.03 |
| 5,950,985 A * | 9/1999 | Petterson | F16L 27/04 |
| | | | 251/149.1 |
| 5,992,895 A | 11/1999 | Steinkamp | |
| 6,029,701 A | 2/2000 | Chaffardon et al. | |
| 6,050,544 A | 4/2000 | Meronek | |
| 6,095,572 A | 8/2000 | Ford et al. | |
| 6,106,026 A | 8/2000 | Smith, III | |
| 6,158,717 A * | 12/2000 | Van Scyoc | F16L 37/34 |
| | | | 137/614.02 |
| 6,217,080 B1 | 4/2001 | Imai | |
| 6,354,564 B1 * | 3/2002 | Van Scyoc | F16L 37/32 |
| | | | 137/614.04 |
| 6,464,260 B1 | 10/2002 | Barrier | |
| 6,497,435 B1 | 12/2002 | Luft et al. | |
| 6,511,098 B1 | 1/2003 | Luterstein | |
| 6,691,978 B1 | 2/2004 | Bartos et al. | |
| 6,786,131 B2 | 9/2004 | Tsai | |
| 6,866,243 B2 | 3/2005 | Yang | |
| 6,877,778 B2 | 4/2005 | Froment et al. | |
| 6,905,151 B2 | 6/2005 | Froment et al. | |
| 7,401,626 B1 | 7/2008 | Plattner | |
| 7,469,718 B2 | 12/2008 | Lambert et al. | |
| 7,658,420 B2 | 2/2010 | Harger et al. | |
| 8,191,932 B2 * | 6/2012 | Davis | F16L 37/23 |
| | | | 137/614.05 |
| 8,439,593 B2 | 5/2013 | Slater et al. | |
| 8,899,550 B2 | 12/2014 | Tiberghien et al. | |
| 2003/0085572 A1 | 5/2003 | Froment et al. | |
| 2004/0251685 A1 | 12/2004 | Nicolino | |
| 2005/0022883 A1 | 2/2005 | Adams et al. | |
| 2005/0109406 A1 | 5/2005 | Marban et al. | |
| 2005/0212289 A1 | 9/2005 | Weh et al. | |
| 2007/0025811 A1 | 2/2007 | Wilhelm | |
| 2007/0236005 A1 | 10/2007 | Chang | |
| 2007/0252101 A1 * | 11/2007 | Khaitov | F16L 37/42 |
| | | | 251/149.1 |
| 2008/0274434 A1 * | 11/2008 | Burdsall | F16L 37/2445 |
| | | | 431/344 |
| 2011/0030825 A1 | 2/2011 | Tivelli | |
| 2012/0209057 A1 | 8/2012 | Siess et al. | |
| 2013/0320668 A1 | 12/2013 | Cheon et al. | |
| 2013/0327420 A1 * | 12/2013 | Liu | F16L 37/42 |
| | | | 137/315.01 |
| 2013/0333767 A1 | 12/2013 | Schmidt | |
| 2014/0001745 A1 | 1/2014 | Lehmann et al. | |

FOREIGN PATENT DOCUMENTS

| | | |
|---|---|---|
| DE | 8 53 994 | 10/1952 |
| DE | 20 50 868 A1 | 6/1972 |
| DE | 1020050 27 297 | 9/2006 |
| FR | 991 346 A | 10/1951 |
| FR | 60 849 E | 1/1955 |
| FR | 1238862 | 8/1960 |
| GB | 0 425 141 | 3/1935 |
| GB | 0 771 968 A | 4/1957 |
| GB | 2 069 083 | 8/1981 |
| GB | 2 093 547 A | 9/1982 |
| WO | WO-94/12826 | 6/1994 |

OTHER PUBLICATIONS

U.S. Office Action, U.S. Appl. No. 13/924,442, 13 pages (dated Sep. 21, 2015).

English-language machine translation of DE 10 2005 027 297, Johann Krause Maschinenfabrik GmbH (Sep. 7, 2006).

English-language machine translation of FR 1238862, F.C. Schulz (Aug. 19, 1960).

English-language machine translation of DE 508311, Kurt Dzialoszynski (Sep. 27, 1930).

English-language machine translation of DE 587085, Ernst Hartmetz (Oct. 30, 1933).

English-language machine translation of DE 853994, Chiron Werke GmbH (Oct. 30, 1952).

U.S. Office Action, U.S. Appl. No. 13/924,455, 4 pages (dated Sep. 30, 2015).

International Preliminary Report on Patentability for PCT Application No. PCT/US2013/047188, dated Dec. 23, 2014, 8 pages.

International Search Report for PCT Application No. PCT/US2013/047188, dated Aug. 14, 2013, 3 pages.

Written Opinion for PCT Application No. PCT/US2013/047188, dated Dec. 21, 2014, 7 pages.

English-language machine translation of DE 20 50 868, Mueanyagfel Dolgozo Vall (Jun. 8, 1972).

Office Action, U.S. Appl. No. 13/924,455, 8 pages (dated May 13, 2016).

Non-Final Office Action, U.S. Appl. No. 13/924,449, 12 pages (dated Jun. 2, 2016).

Office Action, U.S. Appl. No. 13/924,445, 11 pages (dated Mar. 7, 2016).

Office Action, U.S. Appl. No. 13/924,430, 17 pages (dated Jul. 8, 2016).

(56) References Cited

OTHER PUBLICATIONS

Office Action, U.S. Appl. No. 13/924,461, 17 pages (dated Jun. 16, 2016).

* cited by examiner

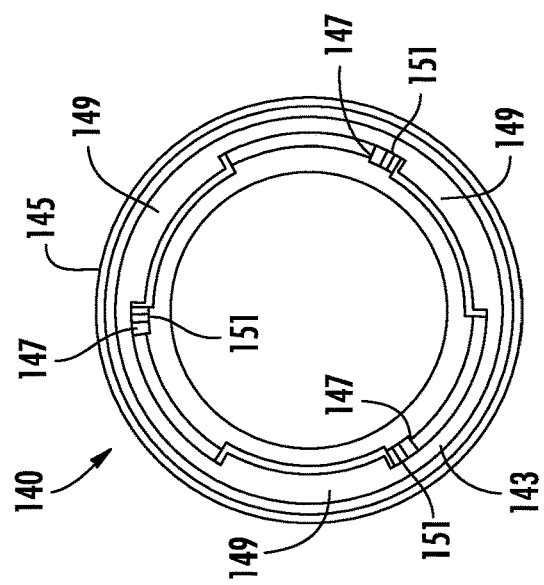
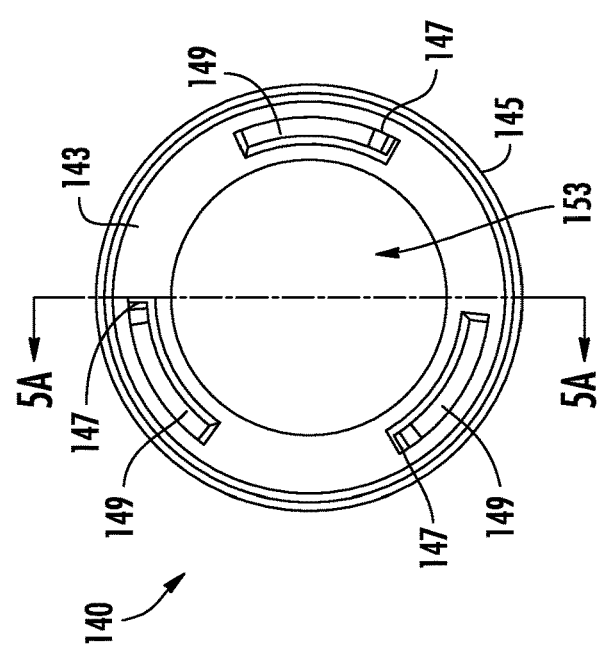
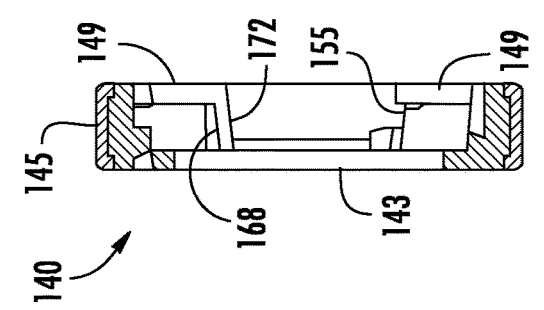

QUICK CONNECT/DISCONNECT ADAPTOR SYSTEM

This application claims the benefit of priority of U.S. provisional application Ser. No. 61/790,045, filed Mar. 15, 2013, the disclosure of which is herein incorporated by reference in its entirety.

FIELD

The disclosure relates generally to connectors for fluid systems and vessels and more particularly to connectors for fluid systems that are quickly connectable and quickly disconnectable from each other.

BACKGROUND

Quick connect/disconnect adaptor systems, which are also referred to herein as quick connect/disconnect systems or as "QCD systems" are configured to facilitate the connection and disconnection of male and female connectors, particularly connectors used to connect a fluid conductor to a source of fluid. For instance, a house typically includes a sillcock, which is usually located at or near the foundation of the house. Oftentimes, this location can make it difficult to thread a hose to the sillcock, since the location can be difficult to access. QCD systems are used, for example, to reduce the difficulty in attaching a hose to the sillcock.

Typically, the QCD system includes a first component which screws onto the sillcock such that a threaded male portion of the sillcock mates with a threaded female portion of the first component. A second component of the QCD system is attached to the hose and often includes a threaded female portion which accepts a threaded male portion of the hose.

The first component and the second component, mate with one another, but typically not in a threaded fashion. Instead, the first component and the second component are coupled together through insertion of the second component into the first component where the two components are held together in watertight fashion by either a press-fit or by a partial rotation of one component with respect to the other component. The partial rotation of one component with the other acts to sealingly engage the first component to the second component to prevent leakage.

One issue encountered by users of QCD systems is that only the second component is connectable to the first component. Thus, when the first component is connected to the fluid source, the second component must be used, thereby preventing users from connecting non-QCD components to the fluid source. For this reason and/or other reasons, further developments in the area of QCD systems are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to quick connect/disconnect systems and methods for connecting and disconnecting fluid dispensing devices. The devices can be hoses, faucets, tubes, pipes, sprinklers, nozzles, wands, and other hose attachments. The system includes a main body which is connected to the source of fluid, such as water, and an adaptor, which is coupled to a delivery device, such as a hose.

According to one embodiment of the disclosure, a quick connect/disconnect (QCD) system includes a first component and a second component. The first component includes a first body defining a first fluid channel extending between a first end portion and a second end portion and defining a longitudinal axis, a first QCD coupling portion located at the first end portion, a first adaptor coupling portion located at the second end portion, and a first mating portion of a mating assembly operably connected to the first body. The second component includes a second body defining a second fluid channel extending between a third end portion and a fourth end portion, a first threaded coupling portion located at the third end portion, a second adaptor coupling portion located between the third end portion and the fourth end portion, and a second mating portion of the mating assembly operably connected to the second body. The mating assembly is configured such that when the first mating portion and the second mating portion are mated, the first adaptor coupling portion is coupled with the second adaptor coupling portion.

According to another embodiment of the disclosure, a method of manipulating a quick connect/disconnect (QCD) system includes aligning a first end portion of a first component, the first component having a second end portion with a first QCD coupling portion, with a third end portion of a second component; and moving a threaded portion of the third end portion within a first body of the first component. The method further includes mating a first mating portion of a mating assembly with a second mating portion of the mating assembly. The first mating portion being operably connected to the first body and the second mating portion being operably connected to a second body of the second component. The method also includes coupling a first adaptor coupling portion located at the first end portion with a second adaptor coupling portion located between the third end portion and a fourth end portion of the second component.

BRIEF DESCRIPTION OF THE DRAWINGS

The above-described features and advantages, as well as others, should become more readily apparent to those of ordinary skill in the art by reference to the following detailed description and the accompanying figures in which:

FIG. 5A is a cross sectional view taken along line 5A-5A of FIG. 5B;

FIG. 5B is an elevational view of a first end of a rotating ring of the first component of FIG. 1A;

FIG. 5C is an elevational view of a second end of the rotating ring of FIG. 5B;

DETAILED DESCRIPTION

Figure 1A:
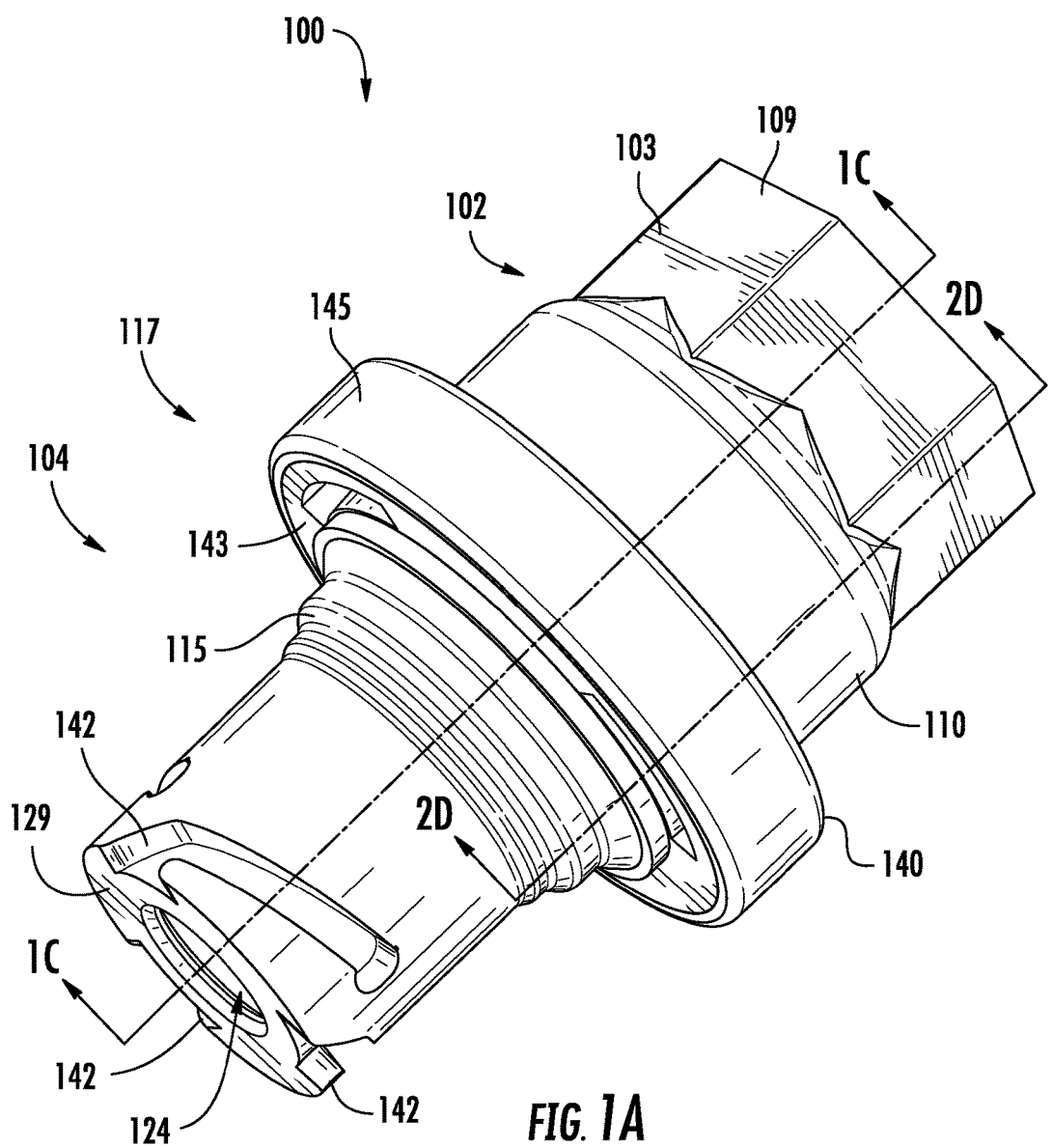
FIG. 1A is a perspective view of a QCD system, as described herein, including a first component and a second component, the first component is shown connected to the second component.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains. It should also be understood that while dimensions are shown, the dimensions are not considered to be limiting and other dimensions are considered to be within the scope of the present invention.

Figure 1B:
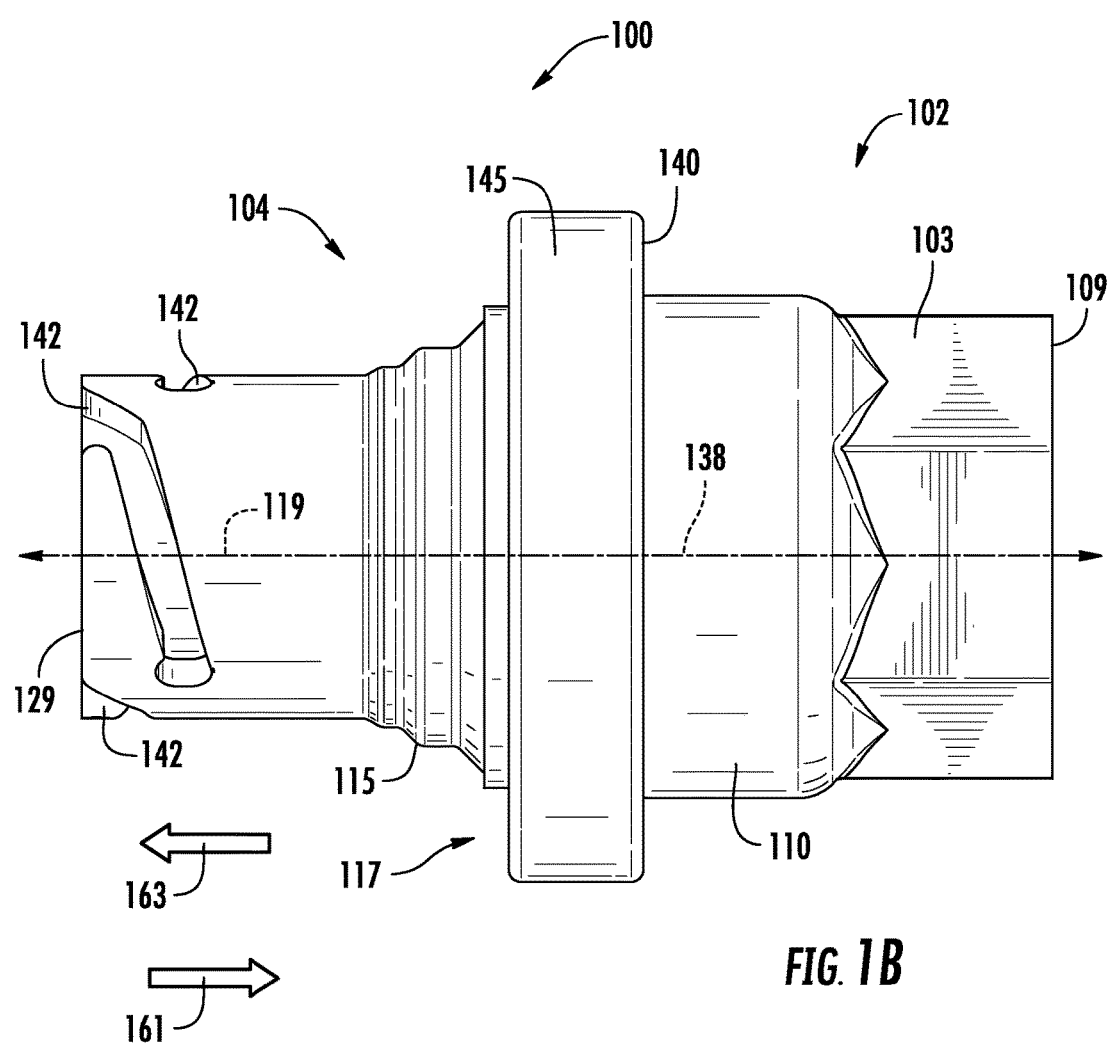
FIG. 1B is a side elevational view of the QCD system of FIG. 1A.
Figure 1C:
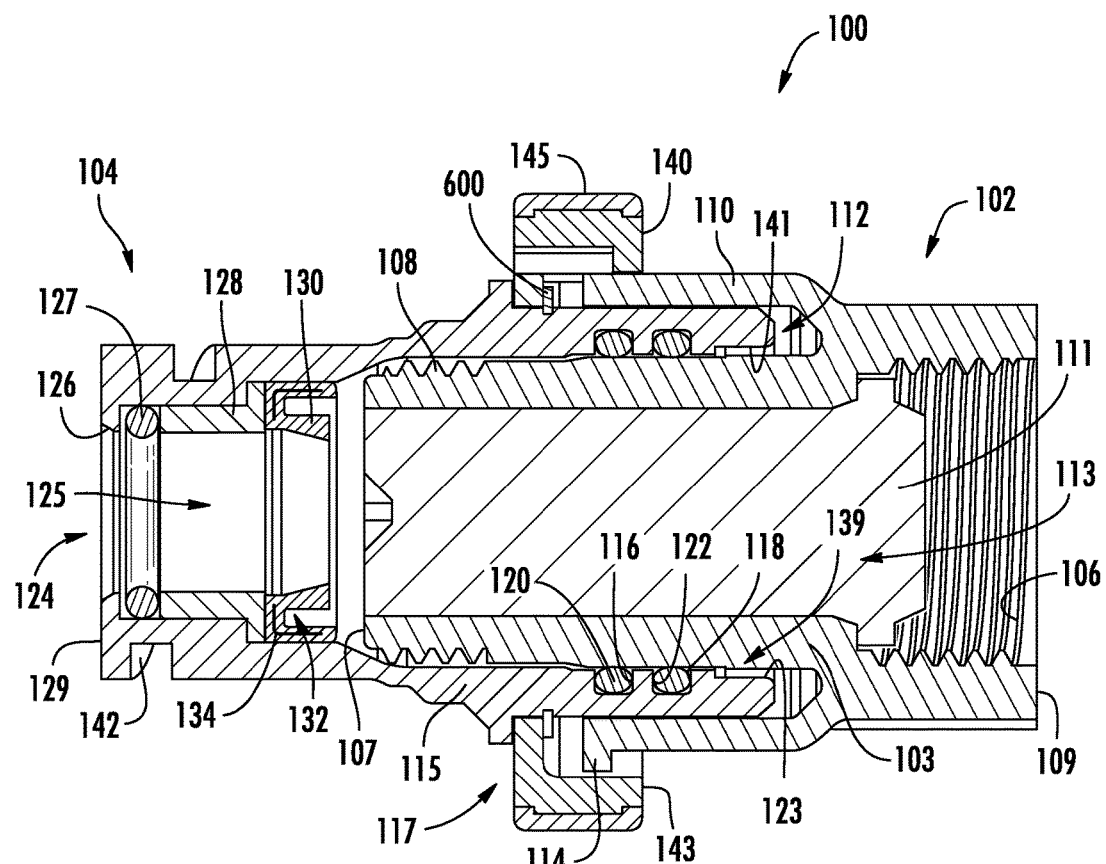
FIG. 1C is a cross sectional view taken along line 1C-1C of FIG. 1A.

FIGS. 1A-1C illustrate one embodiment of a quick connect/disconnect adaptor (QCD) system 100 including an adaptor component 102, a QCD component 104, and a mating assembly 117. With specific reference to FIG. 1C, the adaptor component 102, which is also referred to herein as an "adaptor" and a "second component," includes a body 103 provided as a generally cylindrical wall which extends from a first end portion 107 to a second end portion 109. The body 103 defines a fluid channel 113 that extends between the first end portion 107 and the second end portion 109.

The end portion 109 includes a threaded coupling portion 106 including internal threads, which are configured to mate with corresponding male threads as may be found on a sillcock, faucet, or spigot, for example. The end portion 107 includes another threaded coupling portion 108 including external threads configured to threadingly engage corresponding female threads, such as, the female threads on the female coupler of a hose, for example. The coupling portion 108 can be used in conditions where the quick connect/disconnect feature of the QCD system 100 is not being used and can be coupled directly to a female coupler, for instance. The coupling portion 108 can also be eliminated if desired.

Figure 2A:
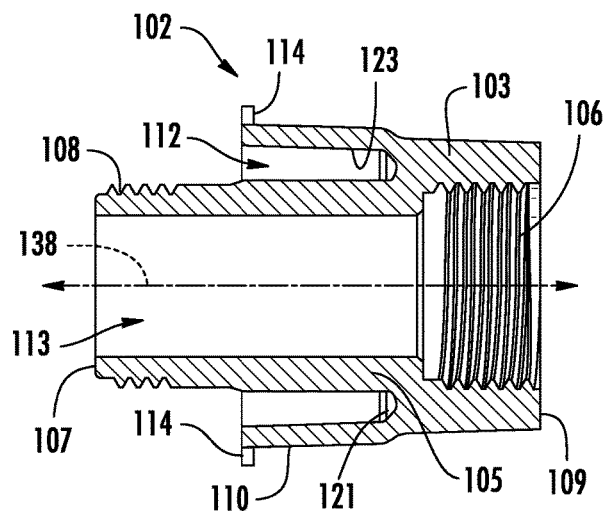
FIG. 2A is a cross sectional view of the second component taken along line 1C-1C of FIG. 1A.
Figure 2B:
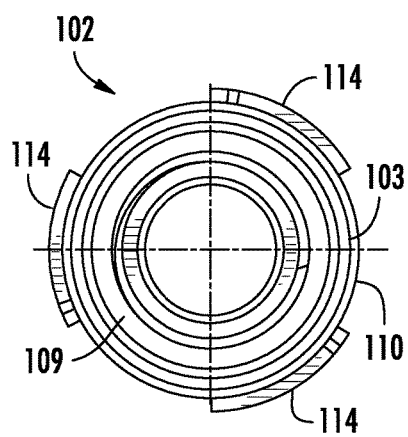
FIG. 2B is an elevational view of a first end of the second component of FIG. 1A.

The adaptor component 102, as shown in FIGS. 2A and 2B, further includes a cuff 110 that is spaced apart from the body 103. A cavity 112, which is configured to receive a portion of the QCD component 104, is defined between the body 103 and the cuff 110. In addition, the cuff 110, which is also referred to herein as a mating portion of the mating assembly 117, includes at least one locking tab 114 (see also FIG. 2E), which is operably connected to the body 103. The locking tab 114 is located at a terminating end of the cuff 110 and defines a detent 167 (FIG. 2E). Because the adaptor component 102 is generally cylindrical, the body 103 and the cuff 110 define a continuous cylindrical configuration which extends completely around a longitudinal axis 138 (FIG. 2A) of the adaptor component 102. A water seal 111 is located within the fluid channel 113 of the adaptor 102, the end of which contacts a threaded male portion (not shown) which threadingly engages the threads 106. A watertight seal is provided between the water seal 111 and threaded male portion.

Figure 2C:
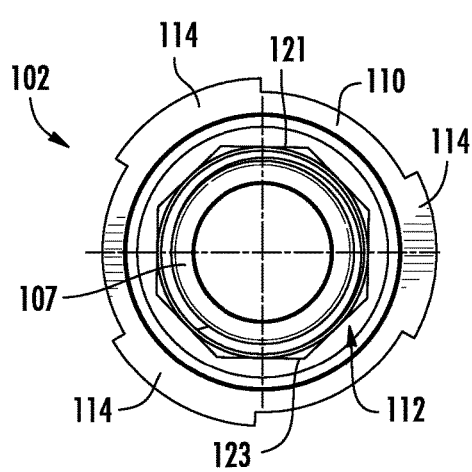
FIG. 2C is an elevational view of a second end of the second component of FIG. 1A.
Figure 2D:
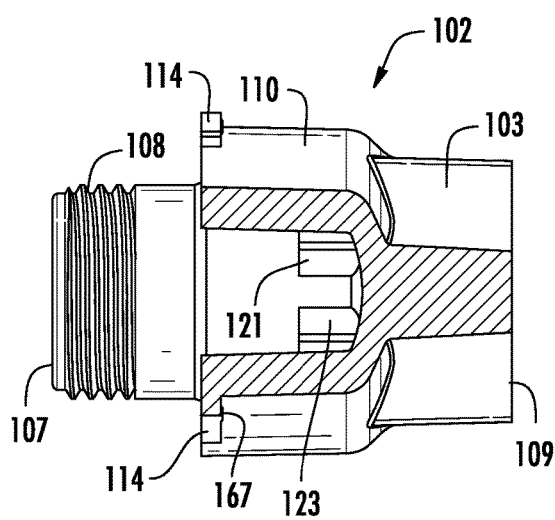
FIG. 2D is a cross sectional view of the second component taken along line 2D-2D of FIG. 1A.
Figure 2E:
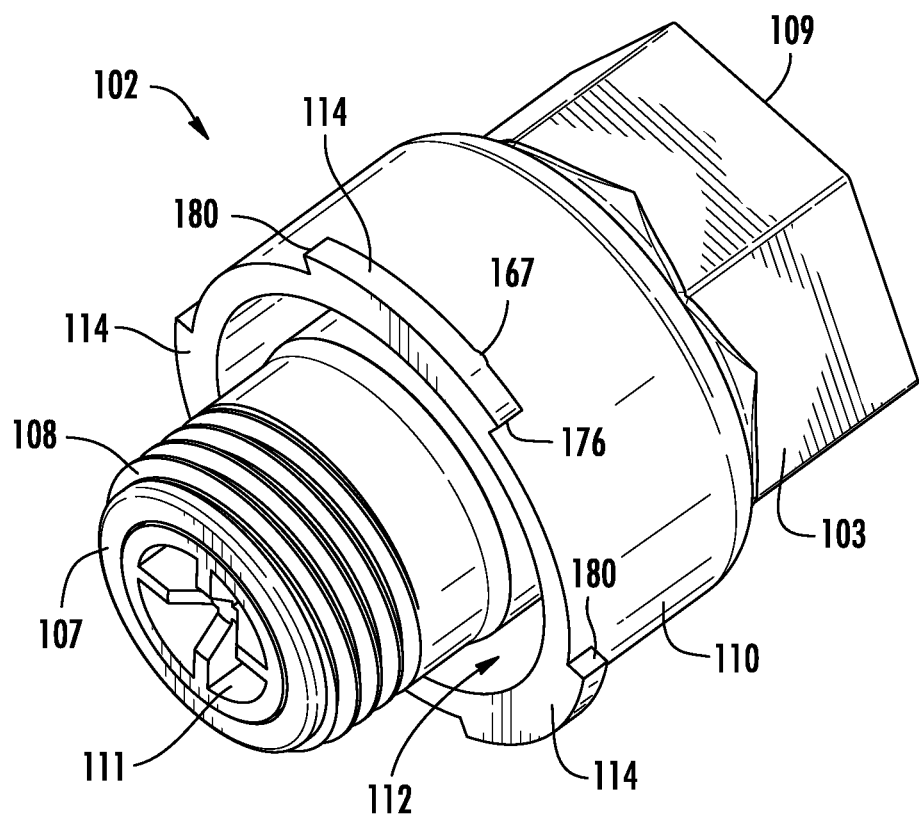
FIG. 2E is a perspective view of the second component of FIG. 1A.
Figure 2F:
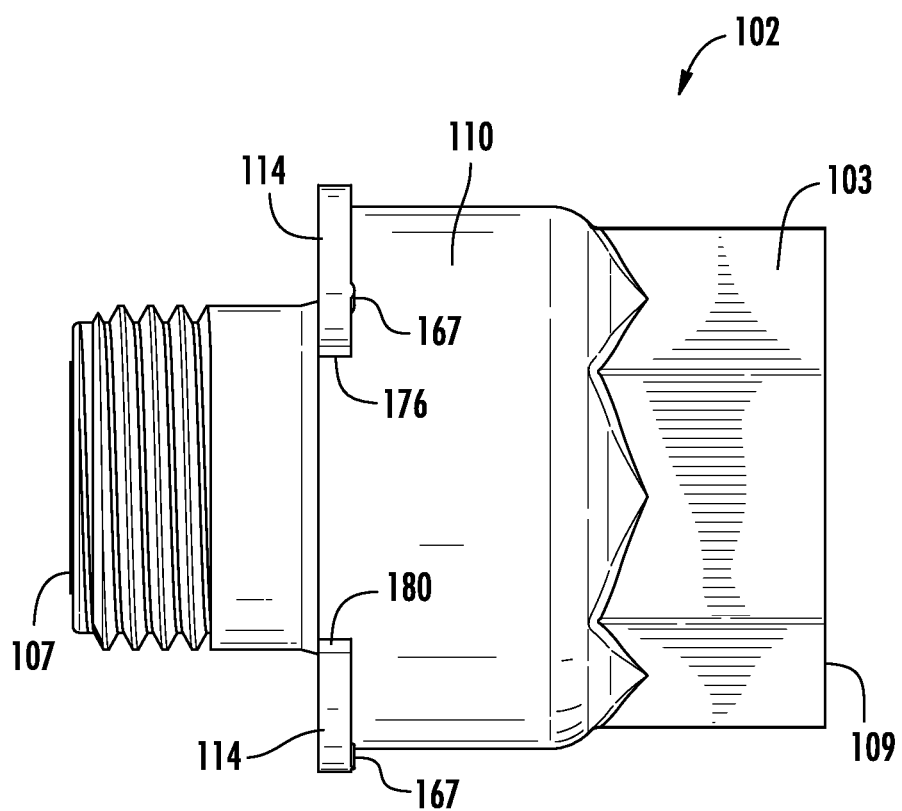
FIG. 2F is an elevational view of the second component of FIG. 1A.

As shown in FIG. 2C and 2D, the adaptor component 102 further includes an adaptor coupling portion 121 that is located in the cavity 112. The adaptor coupling portion 121 is located between the end portion 107 and the end portion 109 and includes an alignment feature 123 that defines a octagonal periphery, in one embodiment.

Figure 4A:
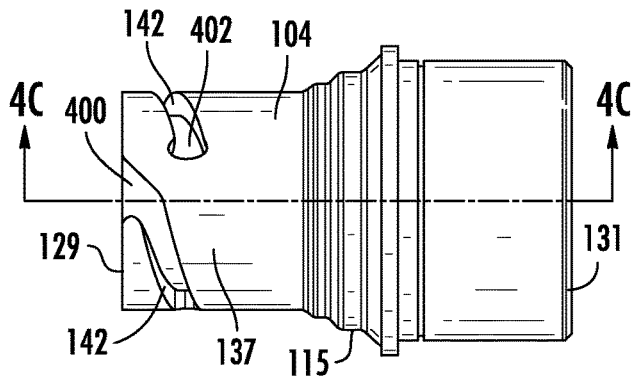
FIG. 4A is first side elevational view of the first component of FIG. 1A shown without a rotating ring.
Figure 4B:
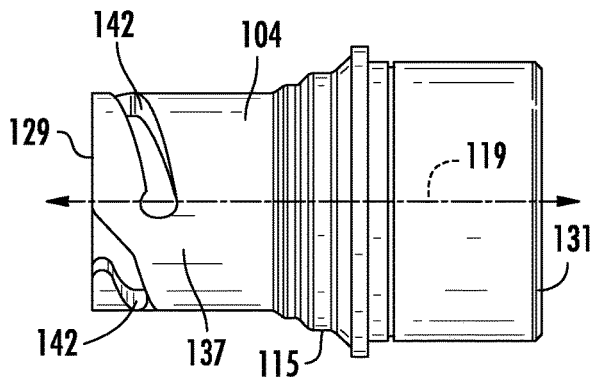
FIG. 4B is a second side elevational view of the first component of FIG. 4A.
Figure 4C:
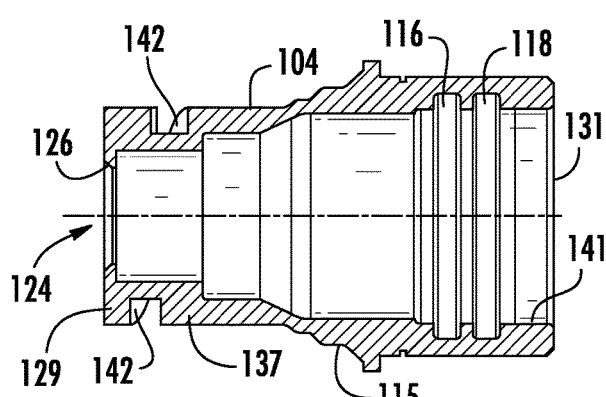
FIG. 4C is cross sectional view taken along line 4C-4C of FIG. 4A.
Figure 4D:
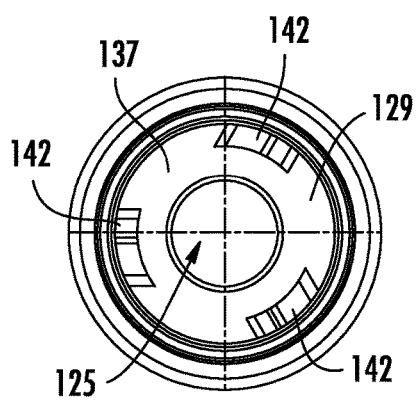
FIG. 4D is an elevational view of a first end of the first component of FIG. 4A.
Figure 4E:
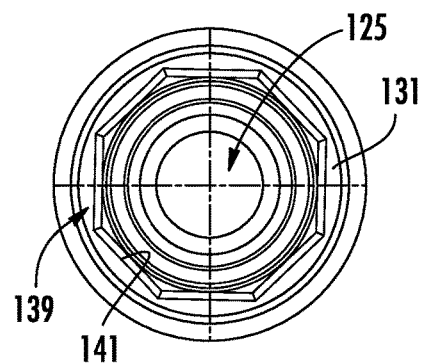
FIG. 4E is an elevational view of a second end of the first component of FIG. 4A.
Figure 4F:
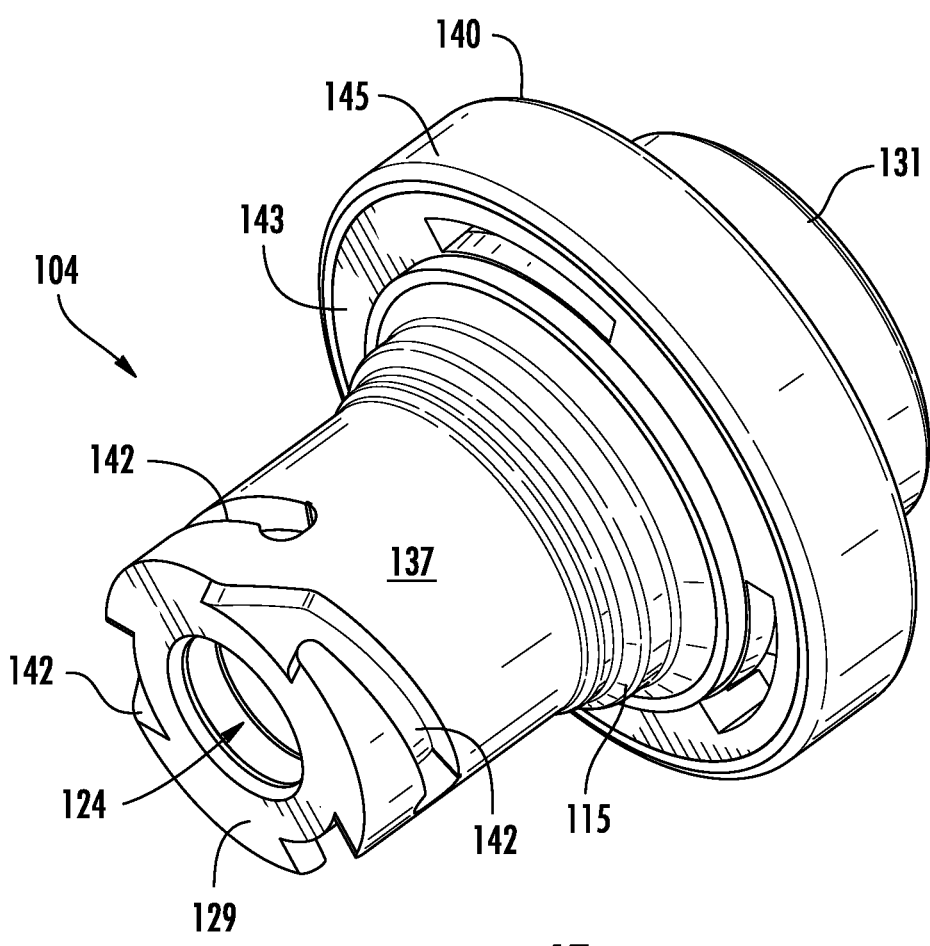
FIG. 4F is a perspective view of the first component of FIG. 1A.
Figure 4G:
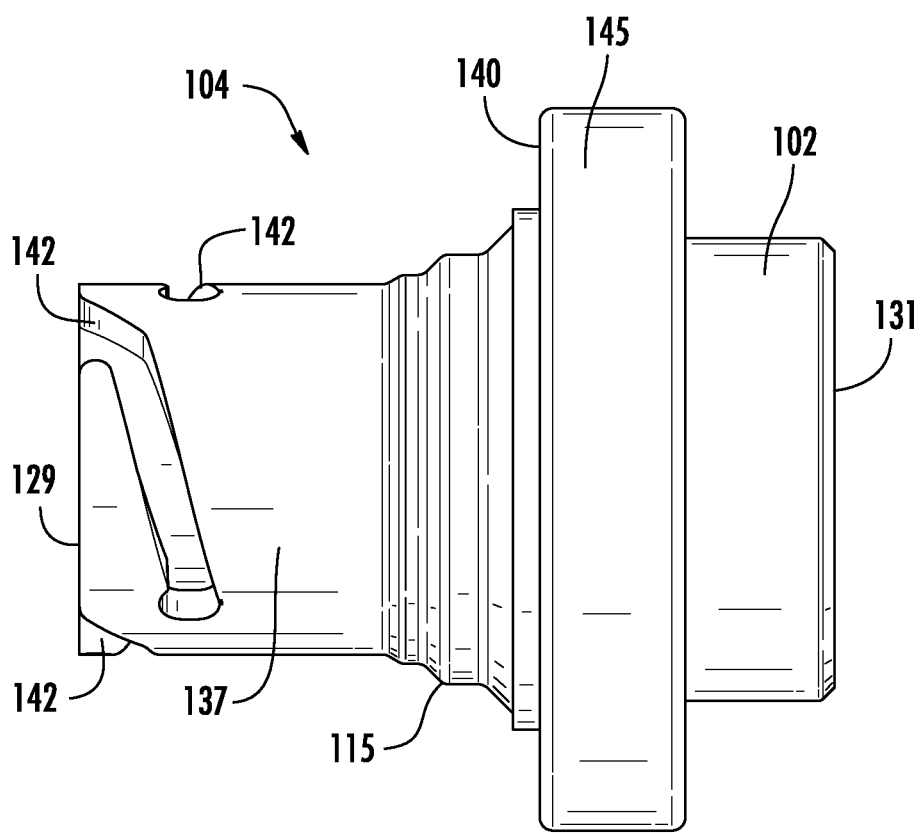
FIG. 4G is a side elevational view of the first component of FIG. 1A.

As shown in FIGS. 4F and 4G, the QCD component 104, which is also referred to herein as a "component" and a "first component," is generally cylindrical and includes a body 115, a portion of which is configured to fit within the cavity 112. The cavity 112 and the body 115 are generally configured to sealingly engage one another.

As shown in FIG. 1C, the body 115 includes a first groove 116 and a second groove 118 that is axially displaced from the first groove 116. The first groove 116 receives a first O-ring 120 that is supported by the body 115, and the second groove 122 receives a second O-ring 122 that is supported by the body 115. The first and second O-rings 120, 122, which are axially displaced from each other, are configured to seal against an outer periphery of the body 103 to provide a watertight seal between the body 103 of the adaptor component 102 and the body 115 of the QCD component 104.

The QCD component 104 defines a fluid channel 125, which extends from a first end portion 129 of the component 104 to a second end portion 131 of the component 104 and defines a longitudinal axis 119 (FIG. 4B) that is coaxial with the longitudinal axis 138 (FIG. 1A), when the components 102, 104 are connected. The fluid channel 125 is configured to fluidly couple with the fluid channel 113 defined in the adaptor 102 to provide for the flow of fluid through the QCD system 100. In particular, fluid flows from the end portion 109 of adaptor 102 coupled to the source of fluid (not shown) and out through an opening 124 defined by an internal flange 126 at end portion 129 of the QCD component 104. An O-ring 127 is placed in contact with the flange 126 and a spacer 128 is placed in contact with the O-ring 127. A sealing member 130 is disposed adjacent to the spacer 128 and is press-fit within the interior of the component 104 to hold the spacer 128 and the O-ring 127 in position. The sealing member 130 includes a cavity 132 which provides a predetermined amount of resiliency. A supporting structure 134 is located within the sealing member 130 to provide structural support.

As shown in FIGS. 4F and 4G, the QCD component 104 also includes a QCD coupling portion 137 located at the end portion 129. The QCD coupling portion 137 defines one or more grooves 142 configured to couple to a corresponding QCD coupling portion (not shown). The groove 142 is provided as a recess configured to engage a corresponding feature on a hose coupler (not shown). As shown in FIG. 4A, the groove 142 is continuous and includes a first end 400 disposed at the open end 124 and a second end 402 laterally displaced from the open end 124.

With reference to FIGS. 1C and 4E, the QCD component 104 includes an adaptor coupling portion 139 located at the end portion 131 of the QCD component 104. The adaptor coupling portion 139 includes an alignment feature 141 that defines an octagonal inside surface, in one embodiment. The alignment feature 131 of the adaptor coupling portion 121 defines a complementary octagonal periphery to the octagonal inside surface of the alignment feature 141. The alignment feature 141 is configured to engage the alignment feature 123 by axial movement of at least one of the components 102, 104 along the longitudinal axis 119, 133, thereby rotationally fixing the QCD component 104 with respect to the adaptor component 102.

As shown in FIG. 4F, the QCD component 104 further includes a two-piece retaining ring 140, which is also referred to herein as a "rotating ring assembly." The retaining ring 140 is disposed around the body 115 and is another mating portion of the mating assembly 117 that is operably connected to the body of the QCD component 104. The retaining ring 140 defines an opening 153 (FIG. 5B) through which the body of the QCD component 104 extends. The retaining ring 140 is rotatable to a locked position and an unlocked position.

As shown in FIGS. 5A-5C, the retaining ring 140 includes a retaining portion 143 and a grip portion 145. The retaining portion 143 includes a connecting axial stop 147 and a disconnecting axial stop 149. The connecting axial stop 147 is configured to abut the locking tab 114 to stop axial movement of the QCD component 104 toward the adaptor component 102 in a connecting direction (arrow 161, FIG. 1B) along the longitudinal axis 119. As shown in FIG. 5C, the retaining ring 140 includes three (3) of the connecting axial stops each of which defines a detent 151. The disconnecting axial stop 149 is configured to abut the locking tab 114 to stop axial movement of the QCD component 104 away from the adaptor component 102 in a disconnecting direction (arrow 163, FIG. 1B) along the longitudinal axis 119. The retaining ring 140 includes three (3) of the disconnecting axial stops 149 each of which defines a detent 155 (FIG. 5A).

With reference to FIG. 5A, the retaining ring 140 further includes at least one locking rotational stop 168 and at least one unlocking rotational stop 172. The locking rotational stop 168 extends from the disconnecting axial stop 149 and is configured to abut a first end 176 (FIG. 2E) of the locking tab 114 and to stop rotational movement of the retaining ring 140 in a locking direction (counterclockwise in FIG. 4F). When the retaining ring 140 is the locked position, the locking rotational stop 168 is positioned against the first end 176 of the locking tab 114. The unlocking rotational stop 172 also extends from the disconnecting axial stop 149 and is configured to abut an opposite second end 180 (FIG. 2E) of the locking tab 114. When the retaining ring 140 is in the unlocked position the unlocking rotational stop 172 is positioned against the second end 180 of the locking tab 114.

Figures 6A, 6B:
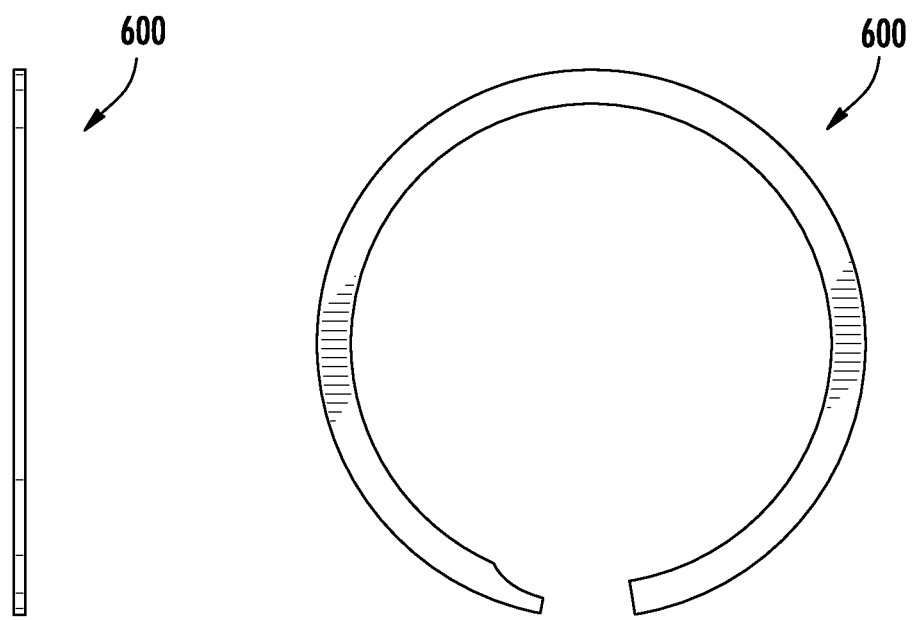
FIG. 6A is a side elevational view of a retaining ring of the first component of FIG. 1A.
FIG. 6B is an elevational view of an end of the retaining ring of FIG. 6A.

With reference now to FIGS. 6A and 6B, a retaining clip 600 (also shown in FIG. 1C) is configured to rotatably secure the retaining ring 140 to the body of the QCD component 104. The retaining clip 600 is formed from metal or any other desired material.

The retaining ring 140 is configured to engage the locking tab 114 and, when rotated to the locked position, to hold the QCD component 104 to the adaptor component 102. Rotation of the retaining ring 140 also compresses the O-rings 116 and 118 at the body 115 against the cuff 110 to strengthen a watertight seal between adaptor component 102 and the QCD component 104. Furthermore, when the rotating ring 140 is in the locked position, the detent 155 on the disconnecting axial stop 149 engages the detent 167 on the locking tab 114, and the detent 151 engages the first end 176 of the locking tab 114 to releasably retain the retaining ring 140 in the locked position.

Figure 3A:
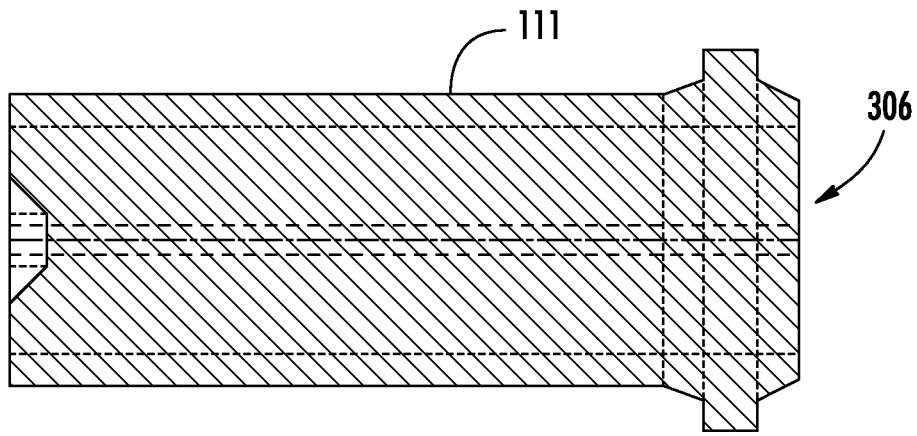
FIG. 3A is a cross-sectional view of a water seal of the QCD system of FIG. 1A.
Figure 3B:
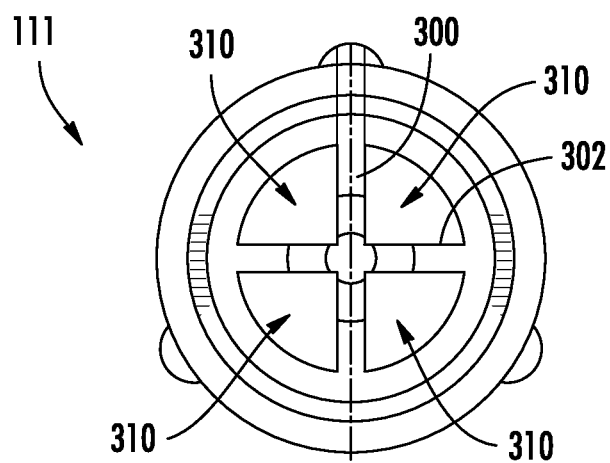
FIG. 3B is an elevational view of an end of the water seal of FIG. 3A.

FIG. 3A illustrates a cross-sectional view of the water seal 111. The water seal 111 is generally cylindrical and defines an internal channel 306 that divided into four subsections 310 by a first divider portion 300 and a second divider portion 302 which extend the length of the seal 111. The first divider portion 300 and the second divider portion 302 provide structural integrity to prevent the water seal 111 from collapsing under the force of the fluid passing therethrough or from contact with the male coupler which threadingly engages the threads 106.

FIGS. 8A-8D illustrate another QCD component 800 for use with the QCD system 100 of FIG. 1A. The QCD component 800 includes a body 804 and a water seal 805 that is similar/identical to the water seal 111. The body 804 includes a first portion 802 defining a first end portion 808 and a second portion 810 defining second end portion 812. The first portion 802 defines a threaded coupling portion 813 that is connected to a threaded coupling portion 816 defined by the second portion 812. The body 804 defines a fluid channel 818 that extends from the first end portion 808 to the second end portion 812 through the water seal 805.

The QCD component 800 further includes a QCD coupling portion 820 and a threaded coupling portion 824. The QCD coupling portion 820 is located at the first end portion 808 and is identical to the QCD coupling portion 137 of the QCD component 104. Accordingly, the QCD coupling portion 820 includes a sealing member 811, a spacer 812, and an o-ring 814 that correspond to the sealing member 130, the spacer 128, and the o-ring 127 of the QCD component 104 (see FIG. 1C).

The threaded coupling portion 824 is located at the second end portion 812 and is identical to the threaded coupling portion 106 of the adaptor component 102. Accordingly, the threaded coupling portion 824 is configured for threaded engagement to the threaded coupling portion 108 of the adaptor component 102.

In operation, the QCD system 100 is manipulated, as described below. First, the adaptor component 102 is connected to a source of fluid, such as a sillcock (not shown). The adaptor component 102 is a versatile unit that makes available to the user both the threaded coupling portion 108 and the cuff 110 of the mating assembly 117. Accordingly, with the adaptor component 102 connected to the sillcock, the female threaded coupling portion of a standard hose (for example) can be connected to the threaded coupling portion 108 or the QCD component 104 can be connected to the cuff 110. Thus, the user is able to easily use accessories, tools, and components that connect to either the coupling portion 108 or the QCD coupling portion 137 of the QCD component 104.

To use the QCD component 104 with the adaptor component 102, first the end portion 131 of the QCD component 104 is aligned with the end portion 107 of the adaptor component 102 such that the longitudinal axis 119 of the QCD component 104 is coaxial with the longitudinal axis 138 of the adaptor component 102. Also, in this configuration the fluid channel 125 of the QCD component 104 is aligned with the fluid channel 113 of the adaptor component 102.

Next, the QCD component 104 is advanced toward the adaptor component 102 so that the threaded coupling portion 108 is moved to a position within the body 115 of the QCD component 104. When the threaded coupling portion 108 is positioned within the body 115, the threaded coupling portion 108 is located between the end portion 129 and the end portion 131 of the QCD component 104. Then, the QCD component 104 is further advanced toward the adaptor component 102 so that the adaptor coupling portion 139 of the QCD component 104 is coupled to the adaptor coupling portion 121 of the adaptor component 102, and the QCD component 104 becomes rotationally fixed relative to the adaptor component 102. The QCD component 104 may have to be rotated with respect to the adaptor component 102 to enable the adaptor coupling portion 121 to couple to the adaptor coupling portion 139.

At substantially the same time (simultaneously) as the adaptor coupling portion 121 is coupled with the adaptor coupling portion 139, the mating portion (i.e. the cuff 110) is mated with the mating portion (i.e. the retaining ring 140) of the mating assembly 117. Mating the portions 110, 140 of the mating assembly 117 includes positioning the locking tabs 114 axially between the axial stops 147 and the axial stops 149 of the retaining ring 140. In particular, the QCD component 104 is moved toward the adaptor component 102 until the axial stops 147 abut the locking tabs 114. Accordingly, the mating assembly 117 is configured such that when the cuff 110 and the retaining ring 140 are mated, the adaptor coupling portion 121 is coupled with the adaptor coupling portion 139 and the end portion 108 is positioned between the end portion 129 and the end portion 131.

After the mating portions 110, 140 are mated, the retaining ring 140 is rotated to lock the QCD component 104 to the adaptor component 102. Rotation of the retaining ring 140 is stopped when the rotational stops 168 abut the end portions 180 of the locking tabs 114 of the cuff 110.

Figure 7A:
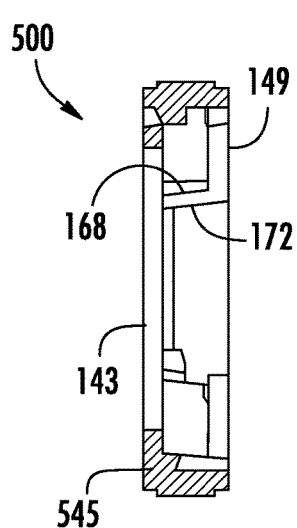
FIG. 7A is a cross sectional view taken along line 7A-7A of FIG. 7B.
Figure 7B:
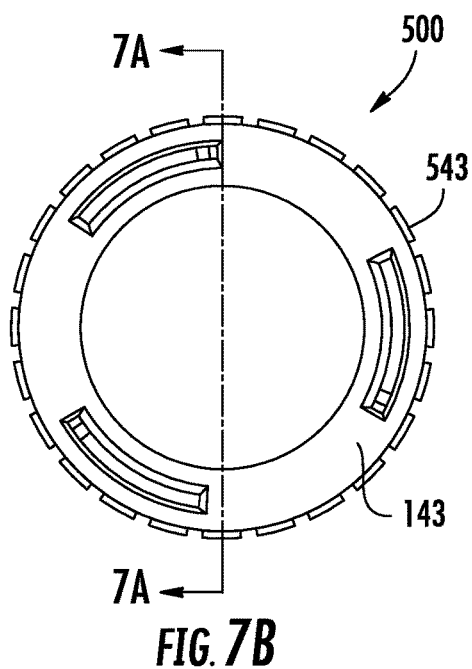
FIG. 7B is an elevational view of a first end of another embodiment of a rotating ring of the first component of FIG. 1A.
Figure 7C:
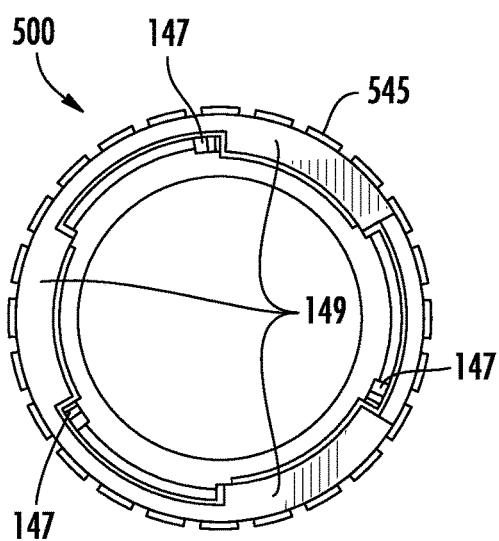
FIG. 7C is an elevational view of a second end of the rotating ring FIG. 7B.
Figure 7D:
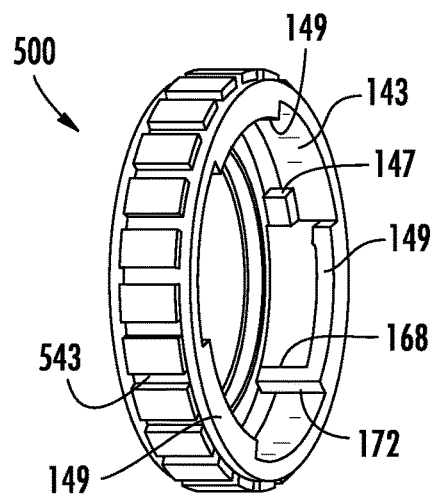
FIG. 7D is a perspective view of the rotating ring of FIG. 7B.
Figure 8A:
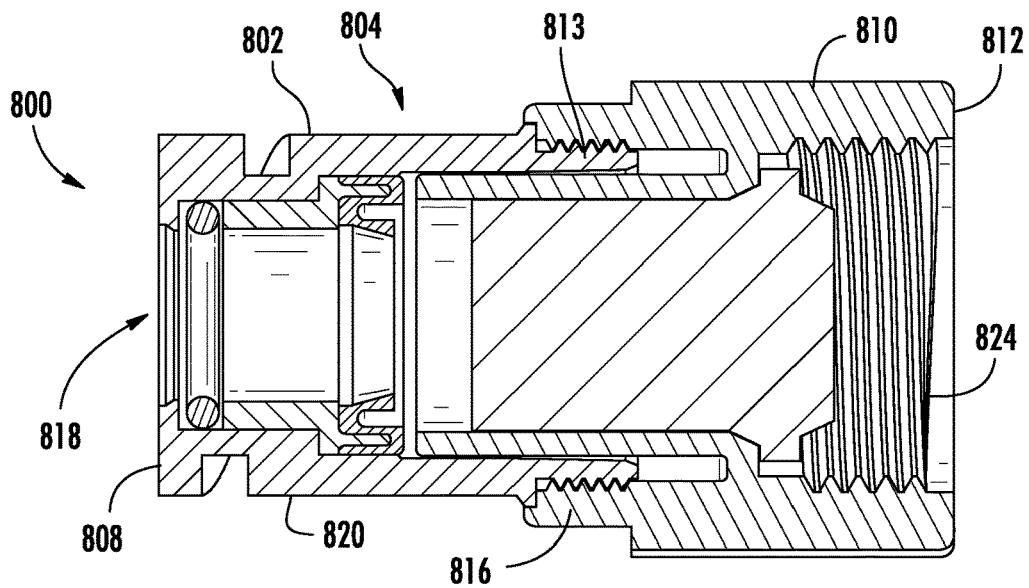
FIG. 8A is a cross sectional view taken along line 8A-8A of FIG. 8C.
Figure 8B:
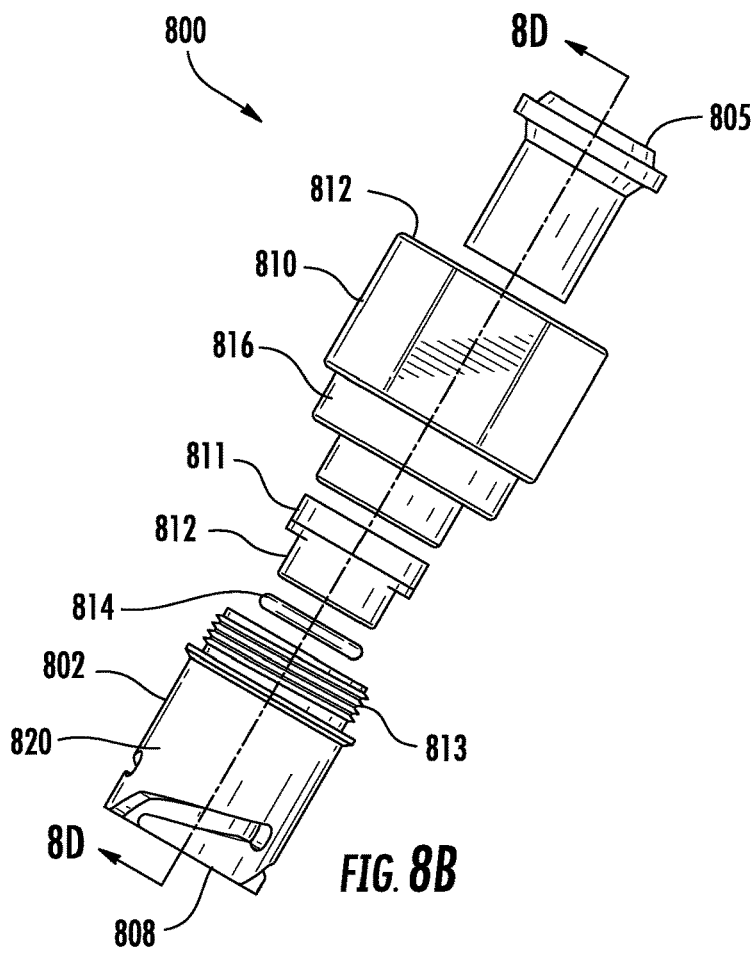
FIG. 8B is an exploded perspective view of a third component of the QCD system of FIG. 1A.
Figure 8C:
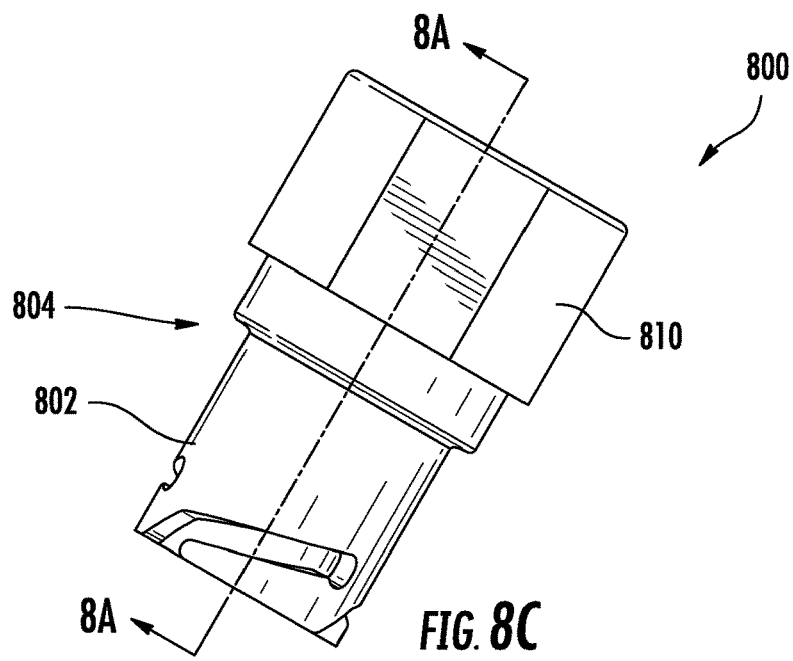
FIG. 8C is a perspective view of the third component of FIG. 8B.
Figure 8D:
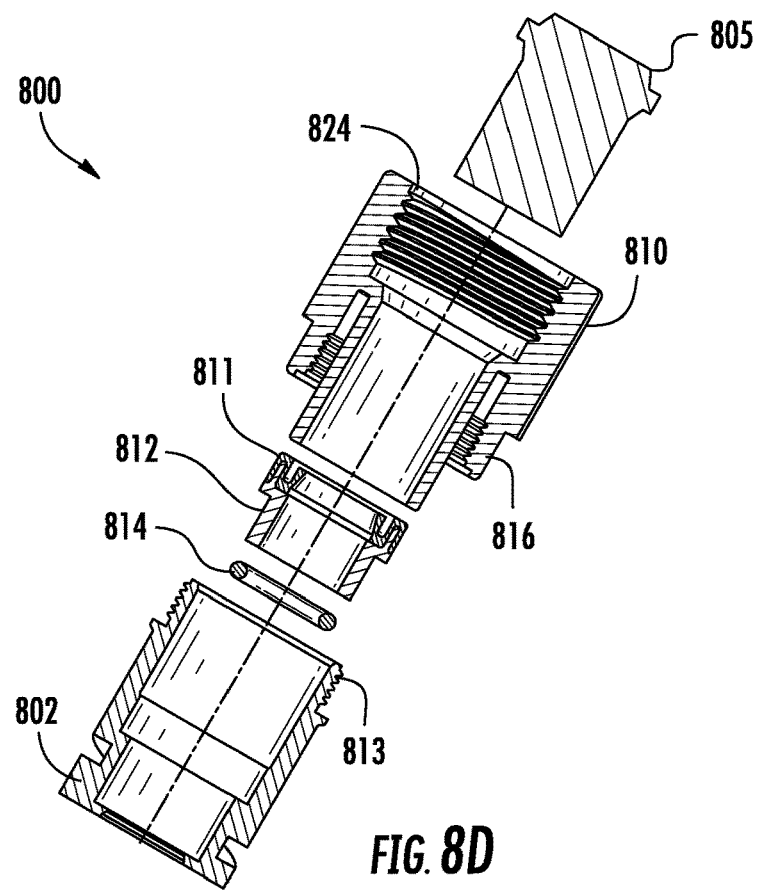
FIG. 8D is a cross sectional view taken along line 8D-8D of FIG. 8B.
Figure 9A:
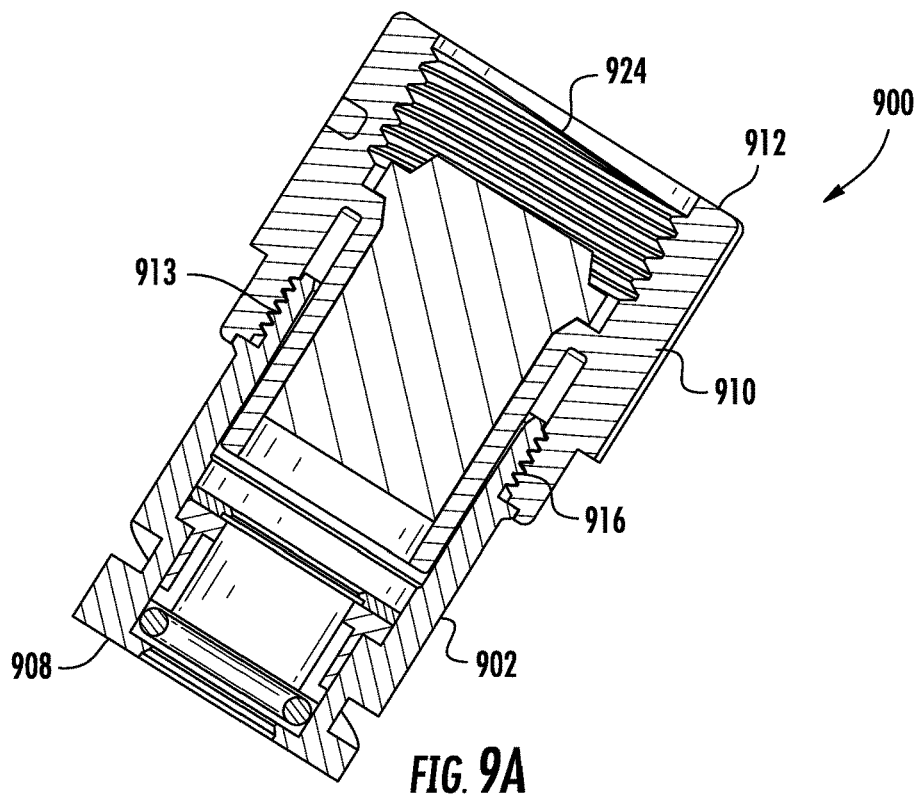
FIG. 9A is a cross sectional view taken along line 9A-9A of FIG. 9C.
Figure 9B:
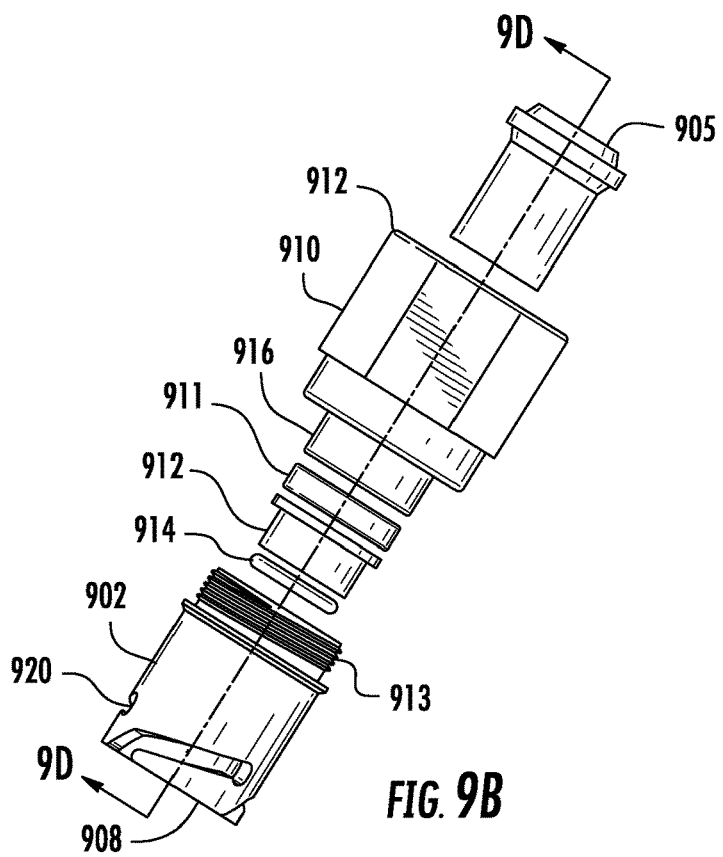
FIG. 9B is an exploded perspective view of another embodiment of a third component of the QCD system of FIG. 1A.
Figure 9C:
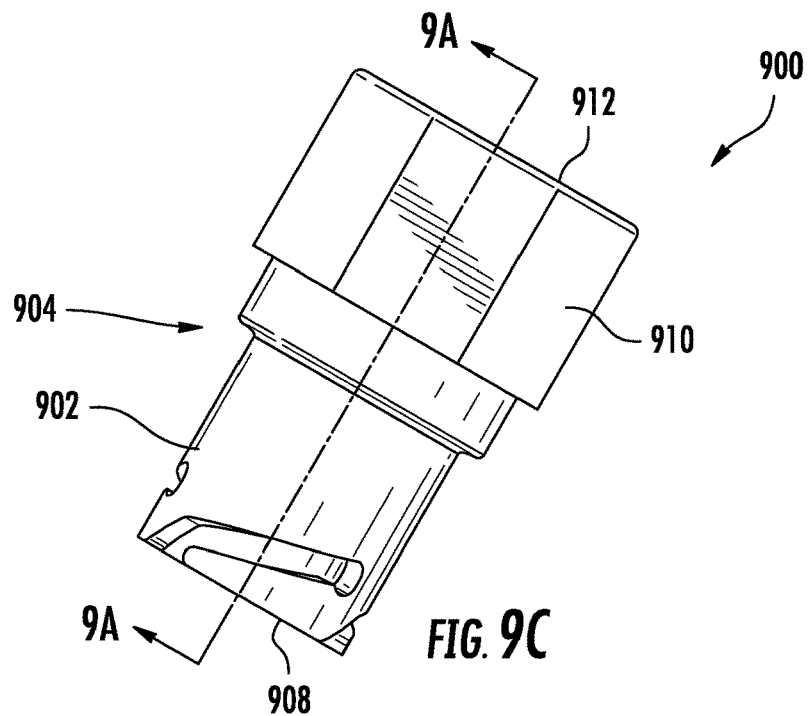
FIG. 9C is a perspective view of the third component of FIG. 9B.
Figure 9D:
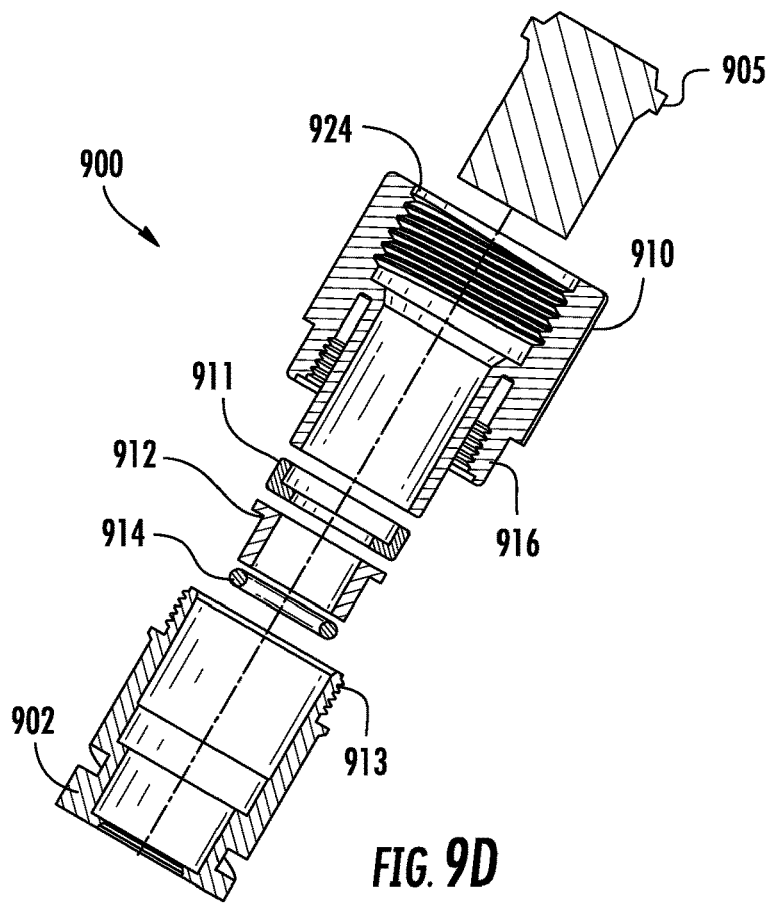
FIG. 9D is a cross sectional view taken along line 9D-9D of FIG. 9B.

Another embodiment of the retaining ring 500 is shown in isolation in FIGS. 7A-7D. The retaining ring 500 is substantially identical to the retaining ring 140 and includes the retaining portion 143. The retaining ring 500, however, includes a grip portion 543 (also referred to herein as an overmold) that has a surface contour configured to provide a user with extra grip for rotating the retaining ring 500 even when the retaining ring 500 is wet. As shown in FIG. 7D, the locking rotational stop 168 is circumferentially displaced from the unlocking rotational stop 172.

FIGS. 9A-9D illustrate another QCD component 900 for use with the QCD system 100 of FIG. 1A. The QCD component 900 includes a body 904 and a water seal 905 that is similar/identical to the water seal 111, 805. The body 904 includes a first portion 902 defining a first end portion 908 and a second portion 910 defining second end portion 912. The first portion 902 defines a threaded coupling portion 913 that is connected to a threaded coupling portion 916 defined by the second portion 912. The body 804 defines a fluid channel 918 that extends from the first end portion 908 to the second end portion 912 through the water seal 905.

The QCD component 900 further includes a QCD coupling portion 920 and a threaded coupling portion 924. The QCD coupling portion 920 is located at the first end portion 908 and is identical to the QCD coupling portion 137 of the QCD component 104. Accordingly, the QCD coupling portion 920 includes a sealing member 911, a spacer 912, and an o-ring 914 that correspond to the sealing member 130, the spacer 128, and the o-ring 127 of the QCD component 104 (see FIG. 1C).

The threaded coupling portion 924 is located at the second end portion 912 and is identical to the threaded coupling portion 106 of the adaptor component 102. Accordingly, the threaded coupling portion 924 is configured for threaded engagement to the threaded coupling portion 108 of the adaptor component 102.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:
1. A quick connect/disconnect (QCD) system comprising:
    a first component including
        a first body defining a first fluid channel extending between a first end and a second end and defining a longitudinal axis,
        a first QCD coupling located at the first end,
        a first adaptor coupling located at the second end, and
        a first mating feature of a mating assembly operably connected to the first body and including a rotating ring assembly; and
    a second component including
        a second body defining a second fluid channel extending between an externally threaded third end and a fourth end,
        a second adaptor coupling located between the third end and the fourth end,
        a second mating feature of the mating assembly operably connected to the second body and including at least one locking tab, and a cavity defined radially between the second mating feature and the third end, wherein the mating assembly is configured such that when the first mating feature and the second mating feature are mated, the first adaptor coupling is received in the cavity and the externally threaded third end is between the first end and the second end and not in threaded engagement with the first component.

2. The QCD system of claim 1, wherein:

the first adaptor coupling includes a first alignment feature; and the second adaptor coupling includes a second alignment feature configured to engage the first alignment feature by axial movement of the second component along the longitudinal axis thereby rotationally fixing the first component with respect to the second component.

3. The QCD system of claim 2, wherein:

the first alignment feature defines an octagonal inside surface; and the second alignment feature defines a complementary octagonal periphery.

4. The QCD system of claim 2, wherein:

the rotating ring includes (i) at least one first rotational stop configured to abut the at least one locking tab and to stop rotational movement of the rotating ring in a first direction, and (ii) at least one second rotational stop configured to abut the at least one locking tab and to stop rotational movement of the rotating ring in an opposite second direction; and the at least one first rotational stop is circumferentially displaced from the at least one second rotational stop.

5. The QCD system of claim 1, wherein the first component further includes:

a first o-ring supported by the first body and configured to seal against an outer periphery of the second body; and a second o-ring supported by the first body and axially displaced from the first o-ring, the second o-ring configured to seal against the outer periphery of the second body.

6. The QCD system of claim 1, further comprising:

a second threaded coupling located at the fourth end.

7. The QCD system of claim 1, further comprising a third component, the third component including:

a third body defining a third fluid channel extending between a fifth end and a sixth end;

a second QCD coupling located at the fifth end; and a second threaded coupling located at the sixth end and configured for threaded engagement to the first threaded coupling.

8. The QCD system of claim 1, wherein the rotating ring further includes:

a first axial stop configured to abut the at least one locking tab and to stop axial movement of the first component in a first direction along the longitudinal axis; and a second axial stop configured to abut the at least one locking tab and to stop axial movement of the first component in an opposite second direction.

9. The QCD system of claim 8, wherein the first rotational stop and the second rotational stop extend from the first axial stop.

10. The QCD system of claim 1, wherein the first QCD coupling is a female coupling including a helical groove on an external surface.

11. The QCD system of claim 1, wherein the first QCD coupling includes an open end and a sealing member positioned within the open end.

12. The QCD system of claim 11, wherein a spacer is positioned between the first end and the sealing member.

13. The QCD system of claim 12, wherein an o-ring is positioned between the first end and the spacer.

14. The QCD system of claim 11, wherein the sealing member includes a supporting structure located within the sealing member.

15. The QCD system of claim 1, wherein the rotating ring assembly is coupled to and rotatable relative to the first body.

16. The QCD system of claim 15, wherein the rotating ring assembly is coupled to the first body via a retaining clip.

17. The QCD system of claim 1, wherein the first adaptor coupling includes a sealing member structured to seal against the second body.

18. The QCD system of claim 1, further comprising a water seal positioned in the second fluid channel and extending substantially to the third end.

19. The QCD system of claim 1, wherein the rotating ring assembly includes a grip portion.

20. The QCD system of claim 19, wherein the grip portion is an overmold.

* * * * *